F. O. WELLS.
THREAD CUTTING TOOL.
APPLICATION FILED DEC. 24, 1914.
1,165,821.
Patented Dec. 28, 1915.
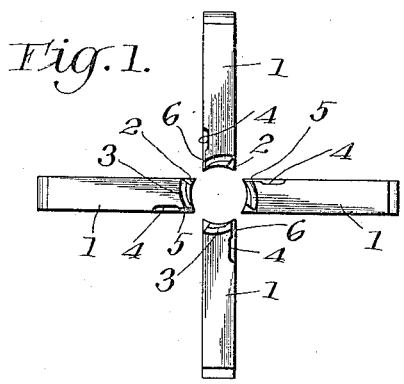
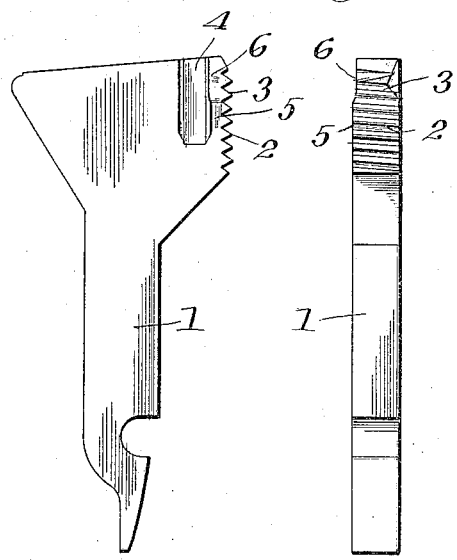
WITNESSES
John C. Sanders
Dudley B. Howard
INVENTOR
Frank O. Wells
BY
ATTORNEY

UNITED STATES PATENT OFFICE.

FRANK O. WELLS, OF GREENFIELD, MASSACHUSETTS.

THREAD-CUTTING TOOL.

1,165,821.   Specification of Letters Patent.   Patented Dec. 28, 1915.

Application filed December 24, 1914. Serial No. 878,885.

*To all whom it may concern:*

Be it known that I, FRANK O. WELLS, citizen of the United States of America, residing at Greenfield, Massachusetts, United States of America, have invented new and useful Improvements in Thread-Cutting Tools, of which the following is a specification.

My invention relates to thread cutting tools and in particular to the taps and dies used in connection therewith.

Heretofore in the cutting of threads, either external or internal, by the use of dies or taps, great difficulty and inconvenience have been experienced in controlling the longitudinal motion of the die so as to cause the same to travel at a uniform rate of speed, which is necessary in order to produce threads of uniform lead throughout. Several attempts have been made to overcome this difficulty by making alterations in the die or tap itself, as the case may be, one method being to provide the die or the like with guiding and cutting teeth, hardening the cutting teeth, and thereafter re-cutting the guiding teeth, which are allowed to remain comparatively soft, by means of a special hob-tap whose threads are of exactly the lead or pitch desired for the thread on the screw blank to be made. Another method consisted in providing a die with a permanent set of guiding or leading teeth and with adjustable and removable members associated therewith and having cutting teeth provided thereon. These devices have proven to be impracticable and inefficient.

It is, therefore, my purpose to provide an extremely simple construction of die or tap which will operate in use to afford the desired lead in an effective and positive manner.

In carrying my invention into effect, I propose to provide a thread cutting tool, each of whose jaws have integrally formed cutting and guiding or leading teeth. The cutting teeth alone are chamfered and given the necessary relief and rake, but the leading teeth are so arranged with respect to the cutting teeth that they may be transformed successively into cutting teeth, as the original cutting teeth become worn excessively, by merely grinding the same into the proper form.

To these ends the invention consists in the combination and construction of parts hereinafter more particularly set forth and claimed, and illustrated in the accompanying drawing, in which:

Figure 1 is an end elevation of a plurality of die jaws of the pivoted type placed in the arrangement which they would assume when assembled in the construction of a die, the teeth of these jaws being constructed in accordance with the present invention; Fig. 2 is a side elevation of one of these jaws; Fig. 3 is a view of the cutting edge of the same.

In the drawing, I have disclosed the invention as being embodied in the jaw construction of a die, which in this particular instance is of the pivoted jaw type, but it is to be understood that the invention may find expression in dies of the integral jaw type, taps, and thread cutting tools in general.

In this instance the cutting edge of each jaw 1 includes a comparatively large number of guiding or leading teeth 2 and a few cutting teeth 3, the advance of the helix of both sets of teeth being regular and uninterrupted. The cutting teeth are chamfered and relieved in the usual manner, whereas the leading teeth are formed without relief and are adapted to fit the threads of the work snugly so as to feed the die at a uniform speed as it is operated. A longitudinal groove 4 is provided in the advance face of the jaw in substantially parallel relation to the cutting edge of the same, whereby a narrow ridge 5 is provided extending along the adjacent ends of the teeth of both sets. This ridge may be ground away as shown at 6 to give the required rake to the cutting teeth. As the cutting teeth become worn excessively by long and hard use, additional cutting teeth may be created by chamfering and relieving a sufficient number of the advance guiding teeth, and by grinding away a new portion of the ridge 5 to give these new cutting teeth proper rake.

Having thus described my invention, what I claim as new and desire to secure by Letters Patent is:

A thread cutting device of the class described having continuous and uninterrupted sets of guiding thread sections and cutting teeth mounted thereon, the device being provided in its advance face with an axial groove extending past the said teeth and thread sections and being spaced inwardly in a radial direction therefrom to leave a ridge at the advance ends of the latter, the ridge being adapted to be reduced and beveled to give rake to the cutting teeth.

In testimony whereof I have signed my name to this specification in the presence of two subscribing witnesses.

FRANK O. WELLS.

Witnesses:
PHILIP H. BALL,
JESSIE S. BLACKMER.